United States Patent [19]

Lange

[11] Patent Number: 5,303,450
[45] Date of Patent: Apr. 19, 1994

[54] CASTER FOR USE ON MOBILE HOSPITAL BEDS AND THE LIKE

[75] Inventor: Hans-Willi Lange, Wermelskirchen, Fed. Rep. of Germany

[73] Assignee: Albert Schulte Sohne GmbH & Co., Wermelskirchen, Fed. Rep. of Germany

[21] Appl. No.: 975,010

[22] Filed: Nov. 12, 1992

[30] Foreign Application Priority Data

Nov. 16, 1991 [DE] Fed. Rep. of Germany ....... 4137757

[51] Int. Cl.$^5$ ............................................. B60B 33/00
[52] U.S. Cl. .................................... 16/35 D; 16/35 R
[58] Field of Search ...................... 16/35 R, 35 D, 20; 188/1.12

[56] References Cited

U.S. PATENT DOCUMENTS

| 2,960,717 | 11/1960 | Moore | 16/35 D |
| 3,911,525 | 10/1975 | Haussels | 16/35 R |
| 4,385,414 | 5/1983 | Damico | 16/35 R |
| 4,722,114 | 2/1988 | Neumann | 16/35 R |
| 4,835,815 | 6/1989 | Mellwig | 16/35 R |
| 4,998,320 | 3/1991 | Lange | 16/35 R |
| 5,115,539 | 5/1992 | Lee | 16/35 R |

FOREIGN PATENT DOCUMENTS

| 489278 | 12/1952 | Canada | 16/35 D |
| 2702211 | 9/1977 | Fed. Rep. of Germany | 16/35 R |
| 2722230 | 11/1978 | Fed. Rep. of Germany | 16/35 R |

OTHER PUBLICATIONS

UK Patent Application No. 2055041A, pub. Feb. 25, 1981, Inventor: Stewart J. Brown.

Primary Examiner—Lowell A. Larson
Assistant Examiner—Donald M. Gurley
Attorney, Agent, or Firm—Darby & Darby

[57] ABSTRACT

A caster wherein the wheel frame and the wheel can be locked in a first axial position of a post which is installed in an upright support serving to turnably mount the frame. When the post is moved to a second axial position relative to the support, the wheel is free to turn in the frame but the frame is releasably held against turning relative to the support. However, if it should become necessary to change the orientation of the frame relative to the support, the frame is turned with a selected force to overcome the bias of a spring which tends to maintain the frame in the selected angular position. Several different angular positions of the frame can be determined by a set of balls which are mounted in a base of the post and by the sockets of a ring-shaped female coupling member which is installed in the frame and whose sockets can receive the balls. The balls are expelled from the aligned sockets to permit turning of the frame relative to the support when the bias of the spring is overcome. Such bias is adjustable. A braking device is provided to lock the frame against turning and to hold the wheel against rotation in the first axial position of the post.

14 Claims, 2 Drawing Sheets

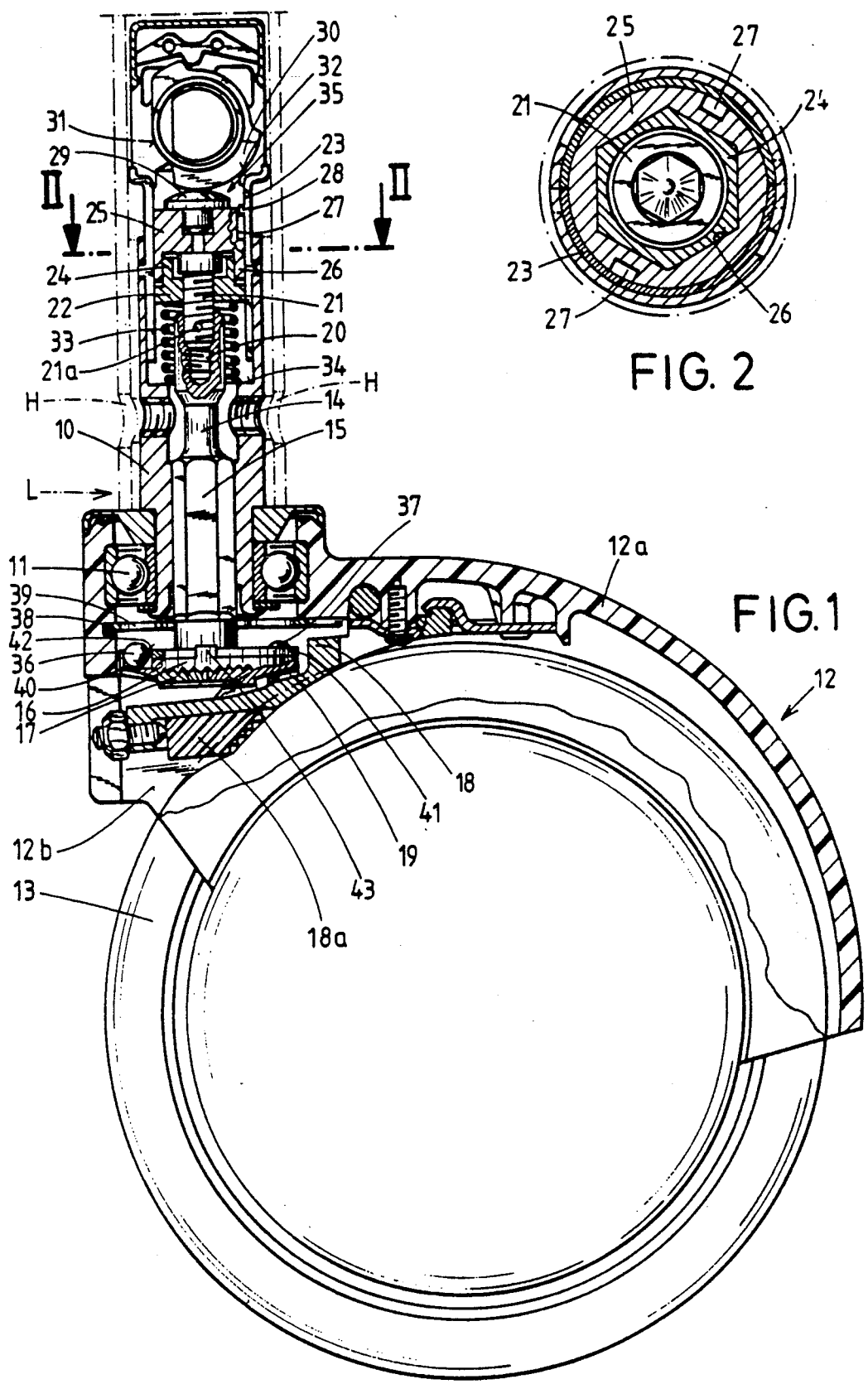

CASTER FOR USE ON MOBILE HOSPITAL BEDS AND THE LIKE

BACKGROUND OF THE INVENTION

The invention relates to casters in general, and more particularly to improvements in casters which can be utilized with advantage on the legs of hospital beds or for similar purposes. Still more particularly, the invention relates to improvements in casters of the type disclosed in commonly owned copending patent application Ser. No. 07/768,059 filed Sep. 27, 1991 for "Caster with pivotable two-armed wheel brake" now U.S. Pat. No. 5,242,035.

The commonly owned copending patent application Ser. No. 07/768,059 discloses a caster wherein a post which is reciprocable in an upright support can be moved up and down between three different positions by a rotary cam which is installed in the support or in the leg of a bed or the like. When the post is moved to one of the three positions, a pivotable braking device not only holds the wheel of the caster against rotation relative to the frame but also prevents the frame from swiveling or turning relative to the support. If the post is moved to another axial position relative to its support, two projections which are provided on a disc-shaped portion of the post enter two complementary recesses in a part of the wheel frame to ensure that the frame is held against swiveling relative to the post (i.e., relative to the support for the post) but the brake is disengaged so that the wheel is free to turn about its axis. This ensures that the direction of forward or rearward movement of the caster remains unchanged. The projections are urged into the respective recesses by a spring which further serves to urge the post toward engagement with the cam. As a rule, the projections have a substantially rectangular or square cross-sectional outline and are snugly receivable in complementary recesses of the wheel frame. This ensures that the orientation of the caster wheel cannot be changed unless the post is forcibly shifted to a different axial position, namely a third position in which the projections are expelled from their recesses and the brake is still disengaged so that the wheel can turn in the frame and the frame is free to swivel in the support.

The projections could be expelled from their recesses by imparting thereto a substantially triangular, trapezoidal or like shape. This would enable an operator to expel the projections from their recesses in response to the application to the wheel frame of a force which is sufficiently pronounced to ensure that the tapering projections must leave their recesses in order to permit a change of angular position of the wheel frame. A drawback of such design is that the person in charge of applying the required force must overcome a substantial amount of friction which, in turn, causes pronounced wear upon the parts to be moved relative to each other. Moreover, the person in charge is not apprised of the exact instant when the wheel frame becomes free to turn or swivel relative to the support. In addition, the bias of the spring which opposes axial displacements of the post and of the wheel frame cannot be adjusted with a required degree of precision, and the bias of such spring is often sufficiently pronounced to prevent a person of average strength from changing the orientation of the wheel frame except by actuating the cam and by thus moving the post to a different axial position in the support prior to actual start of a change in the angular position of the frame. On the other hand, it is equally undesirable to employ a relatively weak spring which is ready to yield in reply to the application to the wheel frame of a small turning force because this would enable the frame to change its orientation at times when the angular position of the frame should remain unchanged. Accordingly, there exists a need for a caster which is constructed and assembled in such a way that the magnitude of the force to be applied in order to change the orientation of the wheel frame can be selected in advance and that the magnitude of such force be variable within a reasonably wide range without affecting the reliability of stability of the frame in a selected angular position relative to its support.

OBJECTS OF THE INVENTION

An object of the invention is to provide a caster which constitutes an improvement over and a further development of casters disclosed in the aforementioned commonly owned copending patent application Ser. No. 07/768,059, now U.S. Pat. No. 5,242,035.

Another object of the invention is to provide a caster which constitutes an improvement over and a further development of casters disclosed in commonly owned copending patent application Ser. No. 07/812,620 filed Dec. 23, 1991 for "Caster with conductors between the tire of its wheel and the carrier of its wheel frame", now U.S. Pat. No. 5,184,373 granted Feb. 9, 1993.

A further object of the invention is to provide a versatile caster which is constructed and assembled in such a way that the angular position of the wheel frame relative to its carrier can be changed without it being necessary to move the post axially of the support in a separate step.

An additional object of the invention is to provide a caster wherein an accurately selected force can be applied to change the orientation of the wheel frame without adjusting the cam for the post which carries the wheel frame.

Still another object of the invention is to provide the caster with novel and improved means for maintaining the wheel frame in a selected angular position relative to the post.

An additional object of the invention is to provide a caster wherein the wheel frame can be releasably held in any desired number of different angular positions relative to the post.

Another object of the invention is to provide a caster which embodies the above outlined features and can be utilized as a superior substitute for existing casters in the legs of hospital beds or the like.

A further object of the invention is to provide the above outlined caster with a novel and improved combination of means for releasably locking the wheel and means for releasably fixing the wheel frame in a selected angular position relative to the support for the post.

Still another object of the invention is to provide a novel and improved method of assembling the above outlined component parts of the improved caster.

SUMMARY OF THE INVENTION

The invention is embodied in a caster, particularly for use on the legs of hospital beds and the like. The improved caster comprises a support (e.g., an upright tubular member which is installed in one leg of a hospital bed), a frame (particularly a bifurcated frame with a top part in the form of a web and with two legs extending downwardly from the web) which is turnably mounted on the support so that it can swivel about a vertical or nearly vertical axis, a wheel which is rotatably mounted in the frame (preferably for rotation about a horizontal axis defined by an axle or shaft mounted in and extending between the legs of the frame), means for simultaneously releasably locking the frame and the wheel against turning relative to the support and against rotation relative to the frame, respectively, and adjustable means for releasably holding the frame in a selected one of a plurality of different angular positions relative to the support.

In accordance with a presently preferred embodiment of the invention, the locking means comprises a post which is non-rotatably and axially shiftably installed in the support so that it can be moved up and down, means (e.g., including a rotary cam installed in the support) for shifting the post relative to the support between first and second positions, one or more stressed coil springs and/or other suitable means for biasing the post toward the shifting means, and a braking device which is provided in the frame and is operative to prevent rotation of the wheel as well as to prevent turning of the frame relative to the support in the first position of the post. The holding means includes means for releasably coupling the frame to the post under the action of the biasing means. The coupling means is disengageable in response to the application to the frame of a turning force which is sufficient to overcome the bias of the biasing means in a direction to move the post axially away from the shifting means. Such caster preferably further comprises means for varying the bias of the biasing means, i.e., for selecting the magnitude of the force which is required to disengage the coupling means and thus permit the frame to turn relative to the support.

The support can include a sleeve and the locking means can further comprise a guide which is reciprocably installed in the sleeve and abuts the shifting means, a threaded retainer which is biased by the biasing means and bears against the guide, and a threaded carrier which is secured to the post and meshes with the retainer. The guide can be non-rotatably installed in the sleeve, and the retainer can comprise a nut which is installed in the sleeve. The carrier can comprise a screw or bolt (hereinafter called bolt) having a shank which mates with the nut and is threaded into the post. One of the parts including the guide and the carrier can be provided with a polygonal socket and the other of these parts is then provided with a complementary polygonal male portion which is reciprocably and non-rotatably received in the polygonal socket. The socket and the polygonal portion can have a hexagonal shape.

One of the parts including the sleeve and the guide can be provided with at least one axially parallel groove and the other of these parts is then provided with a projection (e.g., in the form of a key) extending into the at least one groove to permit reciprocation but to prevent rotation of the guide in the sleeve.

It is further within the purview of the invention to provide the carrier and the retainer with self-locking mating threads.

The coupling means can comprise at least one at least substantially spherical coupling member which is carried by one of the parts including the post and the frame, and a plurality of sockets provided in the other of these parts. Each socket is designed to receive a portion of the at least one coupling member in a predetermined angular position of the frame relative to the support. The at least one coupling member can be provided on the post and the sockets are then provided in the frame. In accordance with a presently preferred embodiment of the invention, the coupling means comprises two at least substantially spherical coupling members which are disposed diametrically opposite each other with reference to the swivel axis for the post. The post includes a base (e.g., a disc-shaped base) with recesses for first portions of the coupling members and a cover having openings for second portions of the coupling members. The cover is operative to retain the first portions of the coupling members in the respective recesses and the coupling members further include third portions which extend beyond the cover and are receivable in selected sockets of the coupling means. The base of the post can be provided with teeth which are engageable with complementary teeth of the braking device in the first position of the post.

The novel features which are considered as characteristic of the invention are set forth in particular in the appended claims. The improved caster itself, however, both as to its construction and the mode of installing and using the same, together with additional features and advantages thereof, will be best understood upon perusal of the following detailed description of certain presently preferred specific embodiments with reference to the accompanying drawings.

BRIEF DESCRIPTION OF THE DRAWINGS

FIG. 1 is a somewhat schematic partly elevational and partly central vertical sectional view of a caster which embodies one form of the invention, the post being shown in the first position in which the wheel is held against rotation relative to its frame and the frame is locked against swiveling relative to its support;

FIG. 2 is an enlarged transverse sectional view as seen in the direction of arrows from the line II—II in FIG. 1.

DESCRIPTION OF PREFERRED EMBODIMENTS

Figure 3:
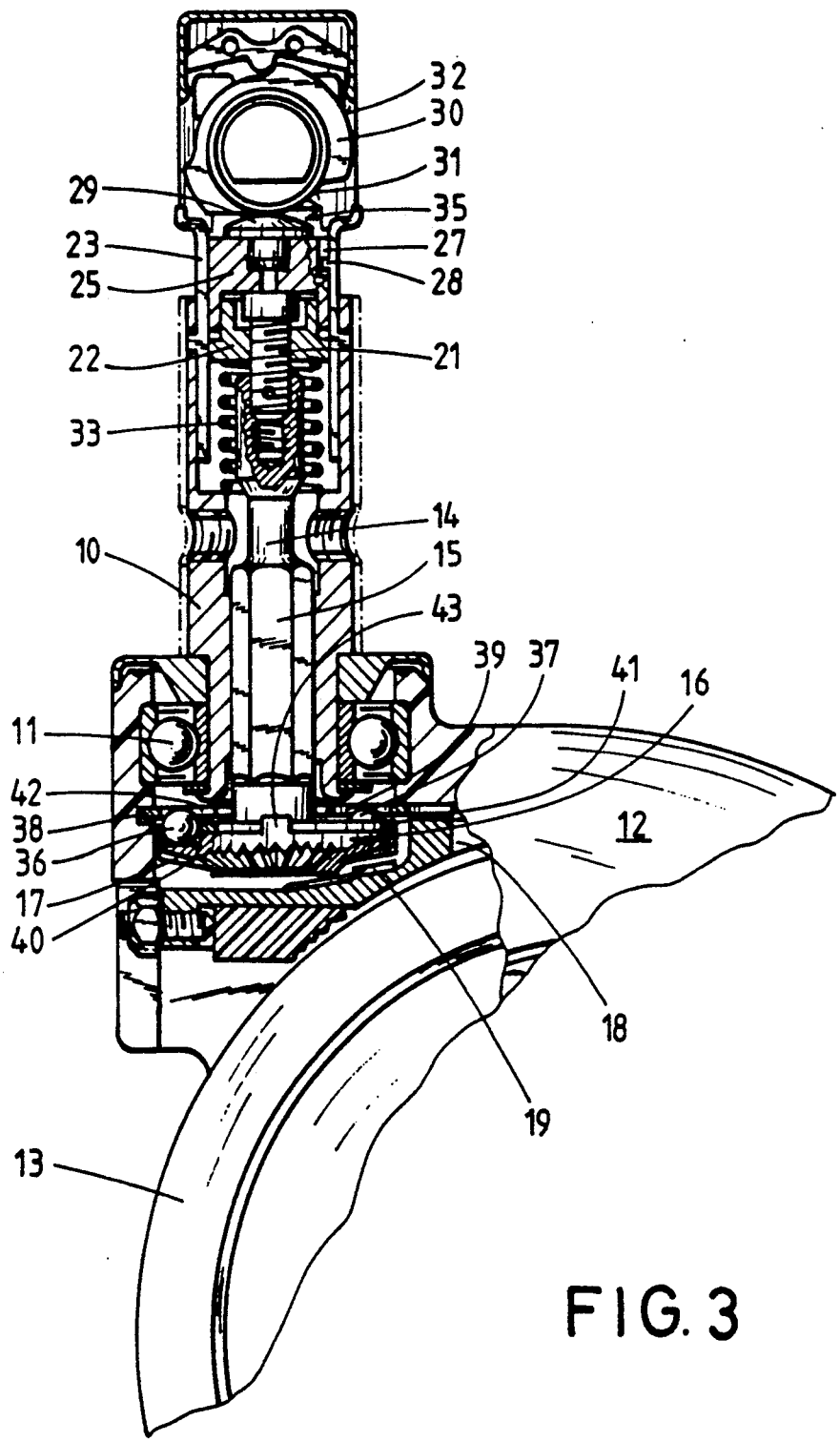
FIG. 3 is a fragmentary partly elevational and partly central vertical sectional view similar to that of FIG. 1 but showing the post in the second position in which the angular position of the frame relative to the support can be changed in response to the application of a variable force against the frame.

FIG. 1 shows a caster which comprises an elongated hollow support in the form of an upright tubular member 10. The latter is receivable in a suitable carrier or holder, e.g., in the hollow lower portion of the leg L of a hospital bed or the like. The leg L is indicated in FIG. 1 by phantom lines and has one or more radial holes H for screws, bolts or like fasteners (not shown) serving to reliably but releasably fix the support 10 in a selected axial position relative to the leg L. The lower end portion of the support 10 carries an anti-friction thrust bearing 11 for an inverted U-shaped (bifurcated) wheel frame 12 having a web 12a and two depending legs 12b (only one leg can be seen in FIG. 1). The bearing 11 enables the frame 12 to swivel or turn about a substantially vertical axis (common to the support 10 and to an axially reciprocable post 14 in the support) when the post 14 is moved to a (second) axial position which is shown in FIG. 3. FIG. 1 shows the post 14 in a first axial position in which the frame 12 is locked against swiveling about the common axis of the support 10 and bearing 11 and in which a wheel 13 of the caster is locked against rotation about its own axis. The axis for the wheel 13 is normal to the axis of the support 10 and is defined by a shaft or axle (not specifically shown) extending between the two legs 12b of the frame 12. Reference may be had to the aforementioned commonly owned copending patent applications Ser. Nos. 07/768,059 and 07/812,620 as well as to one or more granted U.S. patents of the assignee (for example, to U.S. Pat. No. 4,835,815 granted Jun. 6, 1989 to Dieter Mellwig et al. for "Caster with blocking device and depressible releasing member for the blocking device" and/or to U.S. Pat. No. 4,998,320 granted Mar. 12, 1991 to Hans-Willi Lange for "Apparatus for removably supporting beds and the like"). The disclosures of the above patents are incorporated herein by reference.

The post 14 includes an elongated polygonal portion 15 which is non-rotatably received in a complementary portion of an axial passage in the support 10. Thus, the post 14 can move up and down but cannot rotate in the support 10. The lower end portion 16 of the post 14 constitutes a substantially disc-shaped base having an underside provided with a set of radially extending teeth 17 together constituting a bevel gear which can be caused to mesh with the teeth of a gear segment 19 provided on the left-hand arm of a two-armed braking device 18 installed in the frame 12 adjacent the tire or rim of the wheel 13. When the post 14 is moved to the first or lower end position of FIG. 1 (in response to shifting by a rotary cam 30 which is installed in the leg L and/or in the support 10 at a level above the post), an adjustable shoe 18a of the braking device 18 is caused to bear against the tire or rim of the wheel 13 to thus ensure that the wheel cannot rotate in the frame 12 and that the frame cannot swivel or turn about the common axis of the support 10 and thrust bearing 11. The reason is that the post 14 is non-rotatably installed in the support 10 (which cannot turn in the leg L) and the teeth 17 of the base 16 (which cannot rotate because it is of one piece with or is otherwise fixed to the post 14) mate with the teeth of the gear segment 19 which urges the shoe 18a into frictional engagement with the wheel 13.

The upper end portion of the post 14 is provided with an axially extending tapped blind bore 20 for a portion of the shank of a bolt or nut 21 (here shown as a bolt) having a head at a selected level above the upper end of the post 14. The bolt 21 can be fixed in a selected axial position in any one of a number of different ways, for example, by resorting to a bonding agent known as "LOCTITE" (Registered Trademark). Alternatively, it is possible to employ a radially extending screw which can enter into registering holes or bores in the post 14 and in the shank of the bolt 21 when the latter assumes a selected axial position. FIG. 1 merely shows a radially extending bore or hole 21a in the shank of the bolt 21. It is equally possible to employ one or more cotter pins or the like (not specifically shown) to serve as a means for maintaining the bolt 21 in a selected axial position relative to the post 14.

The shank of the bolt 21 is surrounded by and its external threads mate with the internal threads of a retainer 22 which constitutes a nut and can be brought into mesh with the bolt 21 before the latter is fixed in a desired axial position relative to the post 14. The retainer 22 is non-rotatably received in but can move axially relative to a two-piece sleeve 23 (see also FIG. 2) which can be said to form part of the support 10 but can constitute a separately produced part which is non-rotatably affixed to the support.

The retainer 22 comprises a hexagonal member or extension 24 which at least partially surrounds the head of the bolt 21 and non-rotatably extends into a complementary hexagonal socket 26 of a guide member 25 within the two-piece sleeve 23 of or on the support 10. The guide member 25 has an internal surface or shoulder which rests on the head of the bolt 21. The means for preventing rotation of the guide member 25 and sleeve 23 relative to each other comprises two axially parallel grooves or recesses 27 in the peripheral surface of the guide 25 and two complementary projections 28 at the internal surface of the sleeve 23. It is clear that the positions of the grooves 27 and projections 28 can be reversed without departing from the spirit of the invention. The same holds true for the number of projections 28 and recesses or grooves 27. All that counts is to ensure that the guide 25 is free to move axially in but cannot turn in the sleeve 23.

The grooves 27 and the projections 28 can be omitted (or utilized solely as a safety feature) if the external thread of the shank of the bolt 21 and the internal thread of the retainer or nut 22 are designed to establish a self-locking action. As already mentioned hereinabove, the hexagonal socket 26 of the member or extension 24 ensures that the retainer 22 cannot rotate in the guide member 25.

The upper side of the guide member 25 carries a pressure and motion transmitting element 29 which resembles or constitutes a rivet and is in engagement with one of two lobes 31, 32 of the afore-mentioned rotary cam 30 which serves as a means for shifting the post 14 against the opposition of a biasing means in the form of a coil spring 33 or as a means for permitting the spring 33 to move the post 14 and the base 16 axially of the support 10 in a direction toward the axis of rotation of the cam 30. The element 29 can constitute an integral part of the guide member 25. The parts 14, 16, 18, 30, 33 can be said to form part of a composite device which locks the frame 13 against swiveling or turning relative to the support 10 and which simultaneously locks the wheel 13 against rotation relative to the frame 12 when the cam 30 is caused to maintain its lobe 32 in engagement with the element 29 on the guide member 25, i.e., when the constituents of the improved caster assume the positions which are shown in FIG. 1. The reference character 35 denotes an adjusting head which includes the retainer 22, the guide member 25, the bolt 21 and the element 29.

The coil spring 33 surrounds the upper end portion of the post 14, and its lowermost convolution reacts against an internal shoulder 34 of the support 10. The uppermost convolution of the coil spring 33 bears against the underside of the retainer or nut 22 to urge the latter (and hence the guide member 25 and its element 29) toward and against the adjacent lobe 31 or 32 of the cam 30.

The retainer 22 can be said to further constitute a means for varying the bias of the coil spring 33. All that is necessary is to remove the sleeve 23 and the guide member 25 so as to gain access to the retainer 22. By rotating the retainer 22, an operator can change the level of the underside of this retainer in the assembled caster and hence the bias of the coil spring 33.

If the person in charge or even the occupant of the bed including the leg L wishes to permit rotation of the wheel 13 relative to the frame 12, the cam 30 is caused to move its lobe 31 into engagement with the element 29 of or on the guide member 25 so that the coil spring 33 is free to lift the post 14 to the (second) position of FIG. 3. The bevel gear 17 at the underside of the base 16 of the post 14 is then disengaged from the gear segment 19 of the left-hand arm of the braking device 18 so that the wheel 13 is free to turn about its horizontal axis. In accordance with a feature of the invention, this further results in the activation of a holding means including a coupling employing one or more spherical male coupling members 36 in the base 16 of the post 14 and a female coupling member 38 in the form of a ring (e.g., a split ring) which is recessed into and can be said to form part of the frame 13. The holding or coupling means further includes the aforediscussed coil spring 33, and the arrangement is such that the holding means can be temporarily deactivated in response to application to the frame 12 of a turning force which suffices to overcome the selected (variable) bias of the coil spring 33 so that the angular position of the frame 12 relative to the support 10 can be changed to a desired extent, e.g., through angles of 30, 60 or 90 degrees.

The ring 38 has a set of preferably equidistant sockets 39 which can receive the uppermost portions 37 of the two illustrated spherical male coupling members 36 (hereinafter called balls for short) in corresponding angular positions of the frame 12 relative to the support 10 (i.e., relative to the post 14 and base 16 which cannot rotate with reference to the support). The illustrated balls 36 are disposed diametrically opposite each other with reference to the swivel axis of the frame 13 and their lowermost portions extend into recesses (e.g., blind bores or holes) 40 in the upper side of the base 16. The lowermost portions of these balls are retained in the recesses 40 by a disc-shaped cover 41 which is affixed to the upper side of the base 16 and has preferably frustoconical openings 42 for intermediate portions of the balls 36. Thus, the balls 36 can turn in their recesses 40 and in the corresponding openings 42 but their median and lower portions cannot rise above the cover 41. The upper portions 37 of the balls 36 always extend (or preferably always extend) above the upper side of the cover 41 so that they can enter the sockets 39 of the female coupling member 38 when the lobe 31 of the cam 30 cooperates with the coil spring 33 to maintain the post 14 and the disc-shaped base 16 in the axial positions of FIG. 3. The portions 37 of the balls 36 then maintain the frame 12 in a selected angular position relative to the support 10 so that, if the leg L is moved relative to the floor or another support, the balls 36 cooperate with the female coupling member 38 to ensure that the bed will be advanced in a predetermined direction.

The selected angular position of the cover 41 relative to the base 16 of the support 14 is maintained by one or more projections 43 one of which is shown as being provided on the base 16 and extends into a complementary groove or recess of the cover 41. The means for releasably or more or less permanently securing the cover 41 to the upper side of the base 16 can include the projection or projections 43 and/or one or more set screws and/or other suitable fasteners, not shown.

If it is desired to change the angular position of the frame 12 relative to the support 10 (e.g., in order to facilitate advancement of the bed in a different direction), the bias of the coil spring 33 must be temporarily overcome by exerting upon the frame 12 a force which suffices to expel the upper portions 37 of the balls 36 from the aligned sockets 39 of the female coupling member 38 and to thereupon turn the frame relative to the support 10 in order to move the upper portions 37 of the balls into alignment with another pair of sockets 39. Such turning or swiveling of the frame 12 can involve an angular movement which is several times the angular distance between pairs of neighboring sockets 39 in the coupling member 38.

The magnitude of the force which is required to turn the frame 12 relative to the support 10 can be selected within the desired range by appropriate selection of the bias of the coil spring 33 as a result of appropriate manipulation of the retainer 22 as described hereinbefore, i.e., as a result of appropriate selection of axial position of the retainer relative to the axially fixed bolt 21. The spring 33 must yield to an extent which is necessary to lower the post 14 and its base 16 (with the balls 36) relative to the female coupling member 38 so that the upper portions 37 of the balls 36 can leave the aligned sockets 39 and can move along an arcuate path toward positions of alignment with a different pair of sockets 39 in the coupling member 38. At such time, the bevel gear 17 remains disengaged from the gear segment 19.

The bias of the spring 33 need not be varied on numeral occasions. However, if such adjustment becomes necessary, the support 10 is removed from the leg L and the sleeve 23 is detached from the support. This affords access to the guide member 25 which exposes the retainer or nut 22. The latter is then rotated relative to the axially fixed bolt 21 to move to a different level so as to increase or reduce the stressing of the spring 33 when the improved caster is reassembled. When the axial adjustment of the retainer 22 is completed, the guide member 25 is placed on top of the retainer. At such time, the polygonal member 24 and the socket 26 cooperate to prevent rotation of the retainer 22 relative to the guide member 25, and the grooves 27 cooperate with the projections 28 to ensure that the guide member 25 cannot turn in the sleeve 23. In other words, the retainer 22 is reliably fixed in the newly selected axial position to thereby ensure that the newly selected bias of the spring 33 remains unchanged.

The improved caster can be modified in a number of additional ways without departing from the spirit of the invention. For example, the construction and/or mounting of the braking device 18 can be varied in several respects. The illustrated braking device 18 is constructed and mounted in a manner as described in the aforementioned commonly owned copending patent applications Ser. Nos. 07/768,059 now U.S. Pat. No. 5,242,035 and 07/812,620, now U.S. Pat. No. 5,184,373.

The number of balls 36 can be reduced or increased practically at will, the same as the number of sockets 39 in the female coupling member 38. Furthermore, the positions of the balls 36 and that of the coupling member 38 can be reversed and the illustrated coil spring 33 can be replaced with one or more different springs or can be used in conjunction with one or more additional springs. It is equally possible to replace the illustrated spring 33 with a weaker or stronger spring; it is then unnecessary to provide means for varying the bias of the means for biasing the post 14.

It is also possible to replace the balls 36 with otherwise configured male coupling or holding members. For example, the lower portions of the male coupling members can constitute cylinders and the upper portions (37) of such modified male coupling or holding members can remain spherical or substantially spherical.

An important advantage of the improved caster is its simplicity. Thus, it is no longer necessary to employ a cam with three or more lobes because the angular position of the frame 12 can be changed at a time when the wheel 13 is free to rotate and the caster is set to (releasably) hold the frame 12 in a selected angular position.

Another important advantage of the improved caster is that at least some of its parts need not be machined or otherwise finished with a very high degree of precision. Thus, if the magnitude of the force which is required to change the angular position of the frame 12 relative to the support 10 is unsatisfactory, the spring 33 is simply replaced with a different spring or the bias of the spring 33 is varied in the aforedescribed manner or in an analogous way.

The bias of the spring 33 can be varied, or this spring can be replaced with a different spring, with little loss in time and by resorting to relatively simple and readily available tools. As mentioned above, the number of different angular positions of the frame 12 can be selected at will by appropriate selection of angular spacing of the sockets 39 in the female coupling member 38. For example, the neighboring sockets 39 can be disposed at angular distances of 60 degrees from one another.

A further important advantage of the improved caster is that the parts which determine the bias of the spring 33 can be reliably fixed to ensure that, once selected, the bias of the spring will remain unchanged. The hexagonal parts 24, 25 which are shown in FIG. 2 can be replaced with octagonal or other polygonal parts if it is desired to select the bias of the spring 33 in a large number of stages. However, it has been found that the utilization of hexagonal parts 24 and 25 is amply sufficient because this permits a very large number of adjustments of the bias of the spring 33; in fact, the number of different adjustments is so large that one can speak of infinite adjustability of the bias of the spring 33.

The utilization of spherical (or at least partly spherical) male coupling members 36 is preferred at this time because such coupling members render it possible to reduce the friction to a minimum, i.e., to reduce the magnitude of that force which is needed to change the angular position of the frame 12 relative to the support 10.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A caster comprising a support; a frame turnably mounted on said support; a wheel rotatably mounted in the frame; means for simultaneously releasably locking said frame and said wheel against turning relative to said support and against rotation relative to said frame in one position of an actuating means, said means for releasably locking having a biasing means; and coupling means for releasably holding said frame in a selected one of a plurality of different angular positions relative to said support in a second position of the actuating means while allowing rotation of the wheel relative to the frame, wherein said biasing means is adjustable by means for varying the bias of the biasing means.

2. A caster comprising a support; a frame turnably mounted on said support; a wheel rotatably mounted in the frame; means for simultaneously releasably locking said frame and said wheel against turning relative to said support and against rotation relative to said frame in one position of an actuating means; and adjustable means for releasably holding said frame in a selected one of a plurality of different angular positions relative to said support in a second position of the actuating means while allowing rotation of the wheel relative to the frame;

wherein said locking means comprises a post non-rotatably and axially shiftably installed in said support, said actuating means comprising means for shifting said post relative to said support between first and second positions, means for biasing said post toward said shifting means, and a braking device provided in said frame and operative to prevent rotation of said wheel as well as to prevent turning of said frame relative to said support in the first position of said post, said means for releasably holding including means for releasably coupling said frame to said post under the action of said biasing member in the second position of said post.

3. The caster of claim 2, wherein said releasable coupling means is disengageable in response to the application to said frame of a turing force sufficient to overcome the bias of said biasing means in a direction to move said post axially away from said shifting.

4. The caster of claim 3, further comprising means for varying the bias of said biasing means.

5. The caster of claim 3, wherein said support includes a sleeve and said locking means further comprises a guide reciprocably installed in said sleeve and abutting said shifting means, a threaded retainer biased by said biasing means and bearing against said guide, and a threaded carrier secured to said post and meshing with said retainer.

6. The caster of claim 5, wherein said guide is non-rotatably installed in said sleeve, said retainer comprising a nut in said sleeve and said carrier comprising a bolt having a shank mating with said nut and threaded into said post.

7. The caster of claim 5, wherein one of said guide and said carrier has a polygonal socket and the other of said guide and said carrier has a complementary polygonal portion reciprocably and non-rotatably received in said socket.

8. The caster of claim 7, wherein said socket and said polygonal portion have a hexagonal shape.

9. The caster of claim 5, wherein one of said sleeve and said guide has at least one groove and the other of said sleeve and said guide has a projection extending into said at least one groove to permit reciprocation but to prevent rotation of said guide in said sleeve.

10. The caster of claim 5, wherein said carrier and said retainer have self-locking mating threads.

11. The caster of claim 3, wherein said coupling means comprises at least one substantially spherical coupling member carried by one of said post and said frame and a plurality of sockets provided in the other of said post and said frame, each of said sockets being arranged to receive a portion of said at least one coupling member in a predetermined angular position of said frame relative to said support.

12. The caster of claim 11, wherein said at least one coupling member is provided on said post and said sockets are provided in said frame.

13. The caster of claim 11, wherein said coupling means comprises two substantially spherical coupling members which are disposed diametrically opposite each other, said post including a base with recesses for first portions of said coupling members and a cover having openings for second portions of said coupling members and being operative to retain said first portions in the respective recesses, said coupling members having third portions extending beyond said cover and receivable in selected sockets of said coupling means.

14. The caster of claim 13, wherein said base has teeth engageable with complementary teeth of said braking device in the first position of said post.

* * * * *